(12) United States Patent
Masis et al.

(10) Patent No.: US 11,908,088 B2
(45) Date of Patent: Feb. 20, 2024

(54) CONTROLLING VIRTUAL RESOURCES FROM WITHIN AN AUGMENTED REALITY ENVIRONMENT

(71) Applicant: RED HAT, INC., Raleigh, NC (US)

(72) Inventors: Alexander Braverman Masis, Raanana (IL); Adam Christopher Scerra, Berlin, MA (US)

(73) Assignee: Red Hat, Inc., Raleigh, NC (US)

( * ) Notice: Subject to any disclaimer, the term of this patent is extended or adjusted under 35 U.S.C. 154(b) by 0 days.

(21) Appl. No.: 17/342,582

(22) Filed: Jun. 9, 2021

(65) Prior Publication Data
US 2022/0398811 A1    Dec. 15, 2022

(51) Int. Cl.
*G06T 19/00*    (2011.01)
*G06F 3/01*    (2006.01)

(52) U.S. Cl.
CPC ............ *G06T 19/006* (2013.01); *G06F 3/011* (2013.01)

(58) Field of Classification Search
CPC ............................... G06T 19/006; G06F 3/011
See application file for complete search history.

(56) References Cited

U.S. PATENT DOCUMENTS

| | | | |
|---|---|---|---|
| 8,793,587 B2 | 7/2014 | Sayers | |
| 9,965,564 B2 | 5/2018 | Whelihan | |
| 10,007,413 B2 | 6/2018 | Hill et al. | |
| 10,101,874 B2 * | 10/2018 | Kwon | G06F 3/0482 |
| 10,965,544 B2 | 3/2021 | Embarmannar Vijayan et al. | |
| 11,467,656 B2 * | 10/2022 | Spivack | G06V 20/20 |
| 2011/0037712 A1 * | 2/2011 | Kim | H04M 1/72457 |
| | | | 345/173 |
| 2013/0257690 A1 * | 10/2013 | Fujimaki | G02B 27/017 |
| | | | 345/8 |
| 2014/0330511 A1 | 11/2014 | Tison et al. | |
| 2016/0140868 A1 * | 5/2016 | Lovett | G09B 19/0053 |
| | | | 434/118 |
| 2017/0083083 A1 * | 3/2017 | Chu | G06F 1/1686 |
| 2017/0160842 A1 * | 6/2017 | Shimada | G05B 19/0423 |
| 2017/0280188 A1 * | 9/2017 | Mullins | H04N 21/816 |
| 2019/0313059 A1 * | 10/2019 | Agarawala | G06T 13/40 |
| 2019/0362560 A1 * | 11/2019 | Choi | G06F 3/011 |

(Continued)

FOREIGN PATENT DOCUMENTS

WO    WO-2021061349 A1 *    4/2021    ............ G06F 1/163

OTHER PUBLICATIONS

Horejsi, P., "Augmented Reality System for Virtual Training of Parts Assembly," ScienceDirect, 2014, https://www.sciencedirect.com/science/article/pii/S187770581500449X.

(Continued)

*Primary Examiner* — Chante E Harrison
(74) *Attorney, Agent, or Firm* — Kilpatrick Townsend & Stockton LLP

(57) ABSTRACT

Virtual resources can be controlled from within an augmented reality environment. For example, a computing device can display, in an augmented reality environment, a representation of a physical object corresponding to a virtual resource. The computing device can receive an interaction with the representation of the physical object in the augmented reality environment. The computing device can output a command to cause a result in the virtual resource external to the augmented reality environment based on the interaction.

19 Claims, 4 Drawing Sheets

(56) References Cited

U.S. PATENT DOCUMENTS

2020/0250863 A1    8/2020  Shetty et al.
2020/0342676 A1*  10/2020  Koohmarey ............ H04L 67/12
2022/0255995 A1*   8/2022  Berliner .............. G06F 3/04883

OTHER PUBLICATIONS

Tamburini, D., "Augmented Reality becomes mainstream in Manufacturing, changes the face of the Industry," Azure Industry, 2018, https://azure.microsoft.com/en-in/blog/augmented-reality-becomes-mainstream-in-manufacturing-changes-the-face-of-the-industry/.
"What is a virtual machine (VM)?," Red Flat, Downloaded from Internet on Jan. 10, 2022, https://web.archive.org/web/20210601094415/https://www.redhat.com/en/topics/virtualization/what-is-a-virtual-machine.

* cited by examiner

US 11,908,088 B2

CONTROLLING VIRTUAL RESOURCES FROM WITHIN AN AUGMENTED REALITY ENVIRONMENT

TECHNICAL FIELD

The present disclosure relates generally to augmented reality environments. More specifically, but not by way of limitation, this disclosure relates to controlling virtual resources from within in an augmented reality environment.

BACKGROUND

Virtual and augmented reality environments can represent objects and other items in three-dimensional space. Virtual and augmented reality environments can be displayed to users via headsets and other display devices. Sounds corresponding to the virtual or augmented reality environment can be transmitted to the user through headsets, headphones, and other auditory devices. Controllers can provide haptic feedback corresponding to the virtual or augmented reality environment to the user. Through headsets, controllers, and other devices, users can interact with objects and other items represented in virtual and augmented reality environments.

DETAILED DESCRIPTION

Figure 1:
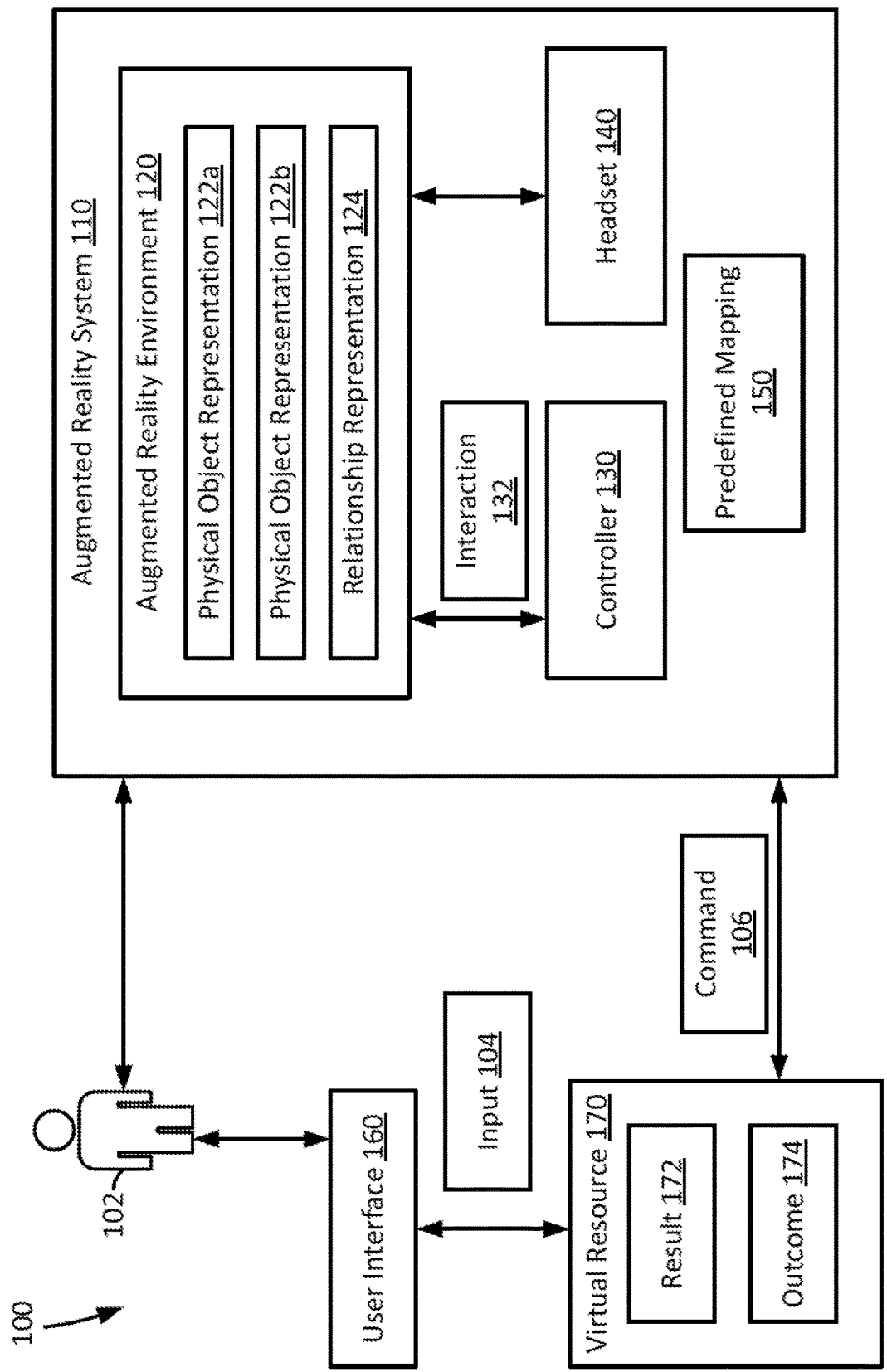
FIG. 1 is a block diagram of an example of a system for implementing virtual resource control from within an augmented reality environment according to some aspects of the present disclosure.

Operations with virtual resources, such as virtual machines, virtual disks, containers, and so on can involve a user navigating a user interface, multiple applications, to perform desired actions on or with the virtual resource. However, the user may not be aware of necessary actions or commands to cause the desired result in the virtual resource. As a result, the user may spend excessive amounts of time attempting to cause the desired result and may negatively impact functionality of the virtual resource, leading to suboptimal use of computing resources.

Some examples of the present disclosure can overcome one or more of the abovementioned problems by providing a system that can present virtual resources in an augmented reality environment that can receive intuitive actions for causing desired results in the virtual resources. The system can display, in an augmented reality environment, a representation of a physical object corresponding to a virtual resource. For example, the system may display a virtual machine as a personal computer (PC) in the augmented reality environment. The system can receive an interaction with the representation of the physical object in the augmented reality environment. For example, the system may receive an interaction corresponding to a storage capacity adjustment, a powering on or off, or a creation or deletion of the virtual resource. The system can output a command to cause a result in the virtual resource external to the augmented reality environment based on the interaction. As a result, the virtual resource can be affected without a user having prior knowledge of a user interface or of commands for causing the desired result. Thus, computing resources for causing the desired result may be used more efficiently and for less time.

As an example, an augmented reality system can display a PC corresponding to a virtual machine in an augmented reality environment. The augmented reality system can receive an interaction with the PC in the augmented reality environment. For example, a user may use a controller to perform an action that corresponds to powering off the PC, such as by selecting a power button on the PC in the augmented reality environment. The augmented reality system can then output a command to cause a result in the virtual machine external to the augmented reality environment based on the interaction. Selecting the power button on the PC in the augmented reality environment can cause a command to be output that causes the virtual machine to be powered off on a computing device that hosts the virtual machine.

These illustrative examples are given to introduce the reader to the general subject matter discussed here and are not intended to limit the scope of the disclosed concepts. The following sections describe various additional features and examples with reference to the drawings in which like numerals indicate like elements but, like the illustrative examples, should not be used to limit the present disclosure.

FIG. 1 is a block diagram of an example of a system 100 for implementing virtual resource control from within in an augmented reality environment 120 according to some aspects of the present disclosure. The system 100 can include an augmented reality system 110 that can objects in the augmented reality environment 120. The objects can be displayed to a user 102 using a headset 140 that is communicatively coupled to the augmented reality system 110.

In some examples, the augmented reality system 110 can display a physical object representation 122a in the augmented reality environment 120. In some examples, the augmented reality environment 120 can be three dimensional with voxels making up the physical object representation 122a. The physical object representation 122a can correspond to a virtual resource 170, such as a virtual machine, a container, a virtual disk, a virtual server, or a virtual network. The virtual resource 170 can be on a server that is local to or remote from the augmented reality system 110. The augmented reality system 110 can include predefined associations between virtual resources and physical objects. For example, a virtual machine can be associated with a representation of a PC, a virtual disk can be associated with a representation of a hard disk, a virtual network can be associated with a representation of cables between devices, etc. Thus, if the virtual resource 170 is a virtual machine, the physical object representation 122a in the augmented reality environment 120 can be the associated physical object (e.g., PC) as defined by the predefined associations.

The augmented reality system 110 can receive an interaction 132 with the physical object representation 122a in the augmented reality environment 120. The user 102 may use the headset 140, via a voice command, or the controller 130, via tactile input, to provide the interaction 132 with the physical object representation 122a. The interaction 132 can include a storage capacity adjustment, a powering on or off, a visualization of internal components, or a creation or deletion of the virtual resource 170. For example, the user 102 may use the controller 130 to select an "on" button on a virtual machine represented as a PC in the augmented reality environment 120.

Based on the interaction 132, the augmented reality system 110 can output a command 106 to cause a result 172 in the virtual resource 170 external to the augmented reality environment 120. That is, the interaction 132 within the augmented reality environment 120 can cause an associated result in the virtual resource 170. For example, selecting the "on" button can result in the virtual resource 170 powering on and selecting a storage volume to add to the virtual resource 170 can result in the storage volume being added to the virtual resource 170. Instead of performing operations and commands at a user interface, such as user interface 160, the user 102 can visualize the virtual resource 170 in the augmented reality environment 120 to perform desired operations quickly and intuitively. In some instances, the augmented reality system 110 automatically implements the result 172 in the virtual resource 170 based on the command 106.

The user 102 may use the user interface 160 in conjunction with the augmented reality environment 120 to interact with the virtual resource 170. The user interface 160 may be accessible by the user 102 via a device, such as a laptop, desktop, or mobile device. The augmented reality system 110 can display the virtual resource 170 as the physical object representation 122a within a physical space where physical objects are also present and visible to the user 102. For example, if the user interface 160 is displayed on a laptop that is on a desk, the user 102 can visualize the physical object representation 122a, the laptop, and the desk simultaneously. The augmented reality system 110 can overlay the physical object representation 122a over portions of the physical space. The user 102 may provide the interaction 132 for powering on the virtual resource 170 in the augmented reality environment 120 and then provide an input 104 at the user interface 160 to perform another operation with the virtual resource 170, such as visualizing internal components of the virtual resource 170. The result 172 of the interaction 132 and an outcome 174 of the input 104 can both occur to the virtual resource 170 and be displayed in the augmented reality environment 120. Thus, each operation performed on the virtual resource 170 can be reflected in the augmented reality environment 120.

Each operation may additionally be reflected at the user interface 160. For example, the user interface 160 may be a terminal for inputting commands and causing changes to the virtual resource 170. When the augmented reality system 110 receives the interaction 132, the augmented reality system 110 can determine the result 172 and display a command associated with the interaction 132 and the result 172 at the user interface 160. The augmented reality system 110 may include a predefined mapping 150 between interactions and results that can be used to determine the result 172 and the corresponding command to display at the user interface 160. Each possible operation on the virtual resource 170 may be included in the predefined mapping 150, or a subset of operations which are capable of being performed within the augmented reality environment 120 may be included in the predefined mapping 150.

In some examples, the augmented reality environment 120 can include multiple physical object representations, such as the physical object representations 122a-b. The physical object representations 122a-b may correspond to the same type of virtual resource (e.g., two virtual machines), or to different types of virtual resources (e.g., a virtual disk and a virtual machine). The augmented reality system 110 can display a relationship representation 124 between the physical object representation 122a and the physical object representation 122b. For example, if the physical object representation 122a corresponds to a virtual machine and the physical object representation 122b corresponds to a virtual disk that is part of the virtual machine, the physical object representation 122b may be displayed within the physical object representation 122a in the augmented reality environment 120. The relationship representation 124 may additionally indicate a relationship between the physical object representation and the device displaying the user interface 160. For example, the physical object representation 122a can correspond to the virtual resource 170 that is a virtual machine on the laptop that displays the user interface 160. The relationship representation 124 can then be a cable, or other indicator, that connects the laptop to the physical object representation 122a.

FIG. 1 is illustrative and non-limiting. Other examples may include more components, fewer components, different components, or a different arrangement of the components shown in FIG. 1. For example, although the augmented reality environment 120 includes two physical object representations in the example of FIG. 1, the augmented reality environment 120 may include a smaller or larger number of physical object representations in other examples. Additionally, while the description of FIG. 1 describes an augmented reality system, other examples may alternatively include a virtual reality system.

Figure 2:
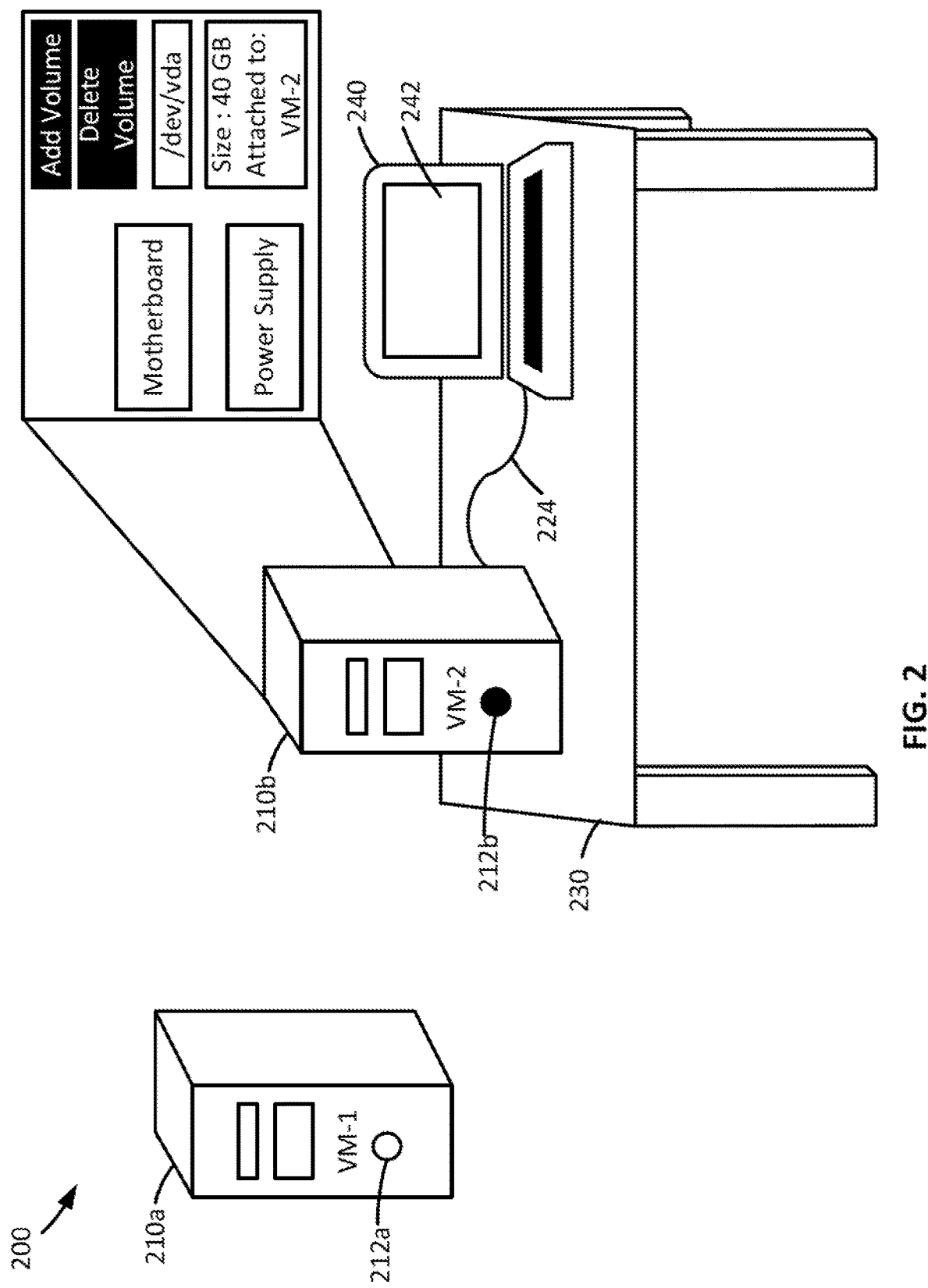
FIG. 2 is a block diagram of an example of an augmented reality environment with representations of virtual resources according to some aspects of the present disclosure.

FIG. 2 is a block diagram of an example of an augmented reality environment 200 with representations of virtual resources according to some aspects of the present disclosure. The augmented reality environment 200 includes physical object representations 210a-b. Both of physical object representations 210a-b correspond to virtual machines. The augmented reality environment 200 also includes a desk 230 and a laptop 240 with a user interface 242. The desk 230 and the laptop 240 are physical objects in a room with the physical object representations 210a-b overlaid as a display in the room. A user may wear a headset or other equipment associated with an augmented reality system to visualize the physical object representations 210a-b in the room.

The physical object representations 210a-b include power-state indicators 212a-b. The power-state indicator 212a can indicate that the physical object representation 210a, and thus the corresponding virtual machine, is powered off, whereas the power-state indicator 212b can indicate that the physical object representation 210b, and thus the corresponding virtual machine, is powered on. The user may choose to perform operations for the virtual machine that corresponds to the physical object representation 210b by pointing or "tapping" on the physical object representation 210, for example, with a controller associated with the augmented reality system. The augmented reality environment 200 can then display the physical object representation 210b as being on the desk 230. Internal components, such as a motherboard and power supply, of the virtual machine can be displayed in response to a second interaction with the physical object representation 210b, such another point or "tap" on the physical object representation 210b. Additionally, information about storage devices associated with the virtual machine can be displayed in the augmented reality environment 200.

The augmented reality environment 200 may display relationships between objects in the augmented reality environment 200. For example, a cable 224 is displayed between the laptop 240 and the physical object representation 210b. The cable 224 can indicate that the virtual machine that the physical object representation 210b corresponds to is related to the laptop 240. As one particular example, the cable 224 can indicate that the virtual machine lives on the laptop 240.

In some examples, the user may be presented with buttons in the augmented reality environment 200 for additional operations that can be performed for the virtual machine. For example, "add volume" or "delete volume" may be presented at a time when storage can be added or removed from the virtual machine. The user can provide an interaction with the respective button in the augmented reality environment 200 to cause the volume to be added or removed.

As the user provides the interactions with the physical object representation 210b, the user interface 242 of the laptop 240 can display commands that are associated with the interactions. For example, the user may delete the physical object representation 210a in the augmented reality environment 200, thereby causing the virtual machine that corresponds to the physical object representation 210a to be deleted on a computing device that hosts the virtual machine. Subsequent to the user providing the interaction at the physical object representation 210a for deleting the virtual machine, a command associated with deleting the virtual machine, such as "nova delete VM-1", can be displayed on the user interface 242. Alternatively, the user may provide the command at the user interface 142 and the result may be displayed in the augmented reality environment 200. For example, the user may provide the command for deleting the virtual machine at the user interface 142, and the physical object representation 210a can be removed from the augmented reality environment 200.

Figure 3:
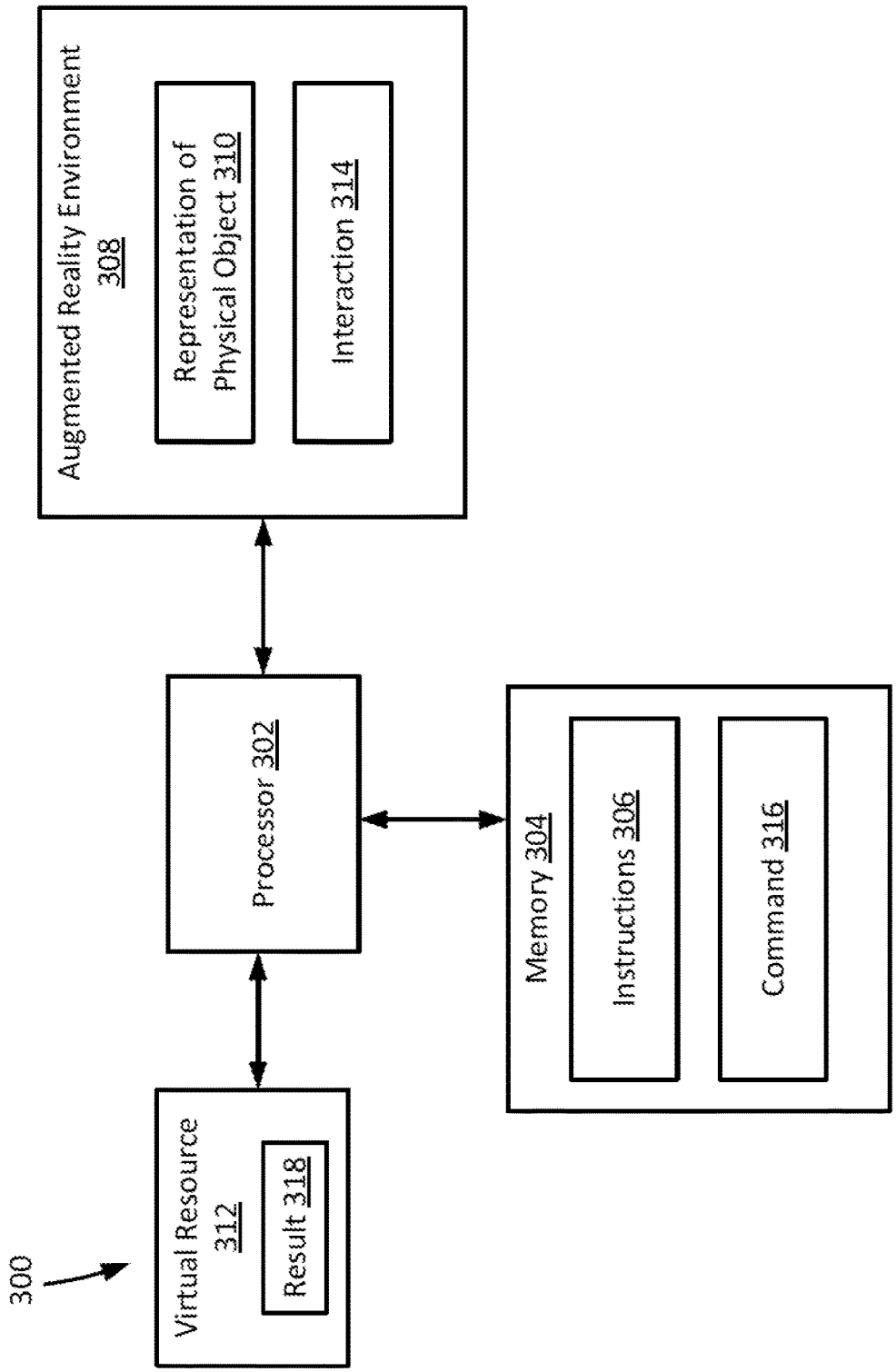
FIG. 3 is a block diagram of another system for implementing virtual resource control from within an augmented reality environment according to some aspects of the present disclosure.

FIG. 3 is a block diagram of another system 300 for implementing virtual resource control from within an augmented reality environment according to some aspects of the present disclosure. The system 300 includes an augmented reality environment 308 that is communicatively coupled to a processor 302 and a memory 304. The processor 302 is also communicatively coupled to a virtual resource 312. The processor 302 and the augmented reality environment 308 may be part of an augmented reality system, such as the augmented reality system 110 in FIG. 1.

The processor 302 can include one processor or multiple processors. Non-limiting examples of the processor 302 include a Field-Programmable Gate Array (FPGA), an application-specific integrated circuit (ASIC), a microprocessor, etc. The processor 302 can execute instructions 306 stored in the memory 304 to perform operations. The instructions 306 may include processor-specific instructions generated by a compiler or an interpreter from code written in any suitable computer-programming language, such as C, C++, C#, etc.

The memory 304 can include one memory or multiple memories. The memory 304 can be non-volatile and may include any type of memory that retains stored information when powered off. Non-limiting examples of the memory 304 include electrically erasable and programmable read-only memory (EEPROM), flash memory, or any other type of non-volatile memory. At least some of the memory 304 can include a non-transitory computer-readable medium from which the processor 302 can read instructions 306. A computer-readable medium can include electronic, optical, magnetic, or other storage devices capable of providing the processor 302 with computer-readable instructions or other program code. Non-limiting examples of a computer-readable medium include magnetic disk(s), memory chip(s), ROM, random-access memory (RAM), an ASIC, a configured processor, optical storage, or any other medium from which a computer processor can read the instructions 306.

In some examples, the processor 302 can execute the instructions 306 to perform operations. For example, the processor 302 can display, in the augmented reality environment 308, a representation of a physical object 310 corresponding to the virtual resource 312. A user may use a headset to visualize the augmented reality environment 308. The virtual resource 312 may be a virtual machine, virtual server, virtual disk, virtual network, or any other virtualized computing resource. The representation of the physical object 310 for the virtual resource 312 can be a physical object that shares the most properties with the virtual resource 312. Associations between virtual resources and physical objects can be predefined. The processor 302 can receive an interaction 314 with the representation of the physical object 310 in the augmented reality environment 308. The interaction 314 can include a storage capacity adjustment, a powering on or off, a visualization of internal components, or a creation or deletion of the virtual resource 312. The user may provide the interaction 314 via a controller associated with the augmented reality environment 308. The processor 302 can output a command 316 to cause a result 318 in the virtual resource 312 external to the augmented reality environment 308 based on the interaction 314. For example, the interaction 314 may be for powering on the virtual resource 312. Based on the interaction 314, the processor 302 can output the command 316 to indicate that the virtual resource 312 is to be powered on. In response to the command 316, the virtual resource 312 is powered on. The user can intuitively cause the result 318 without knowledge of commands for causing the result or extensive navigation of a user interface, thereby usage of computer resources may be reduced.

Figure 4:
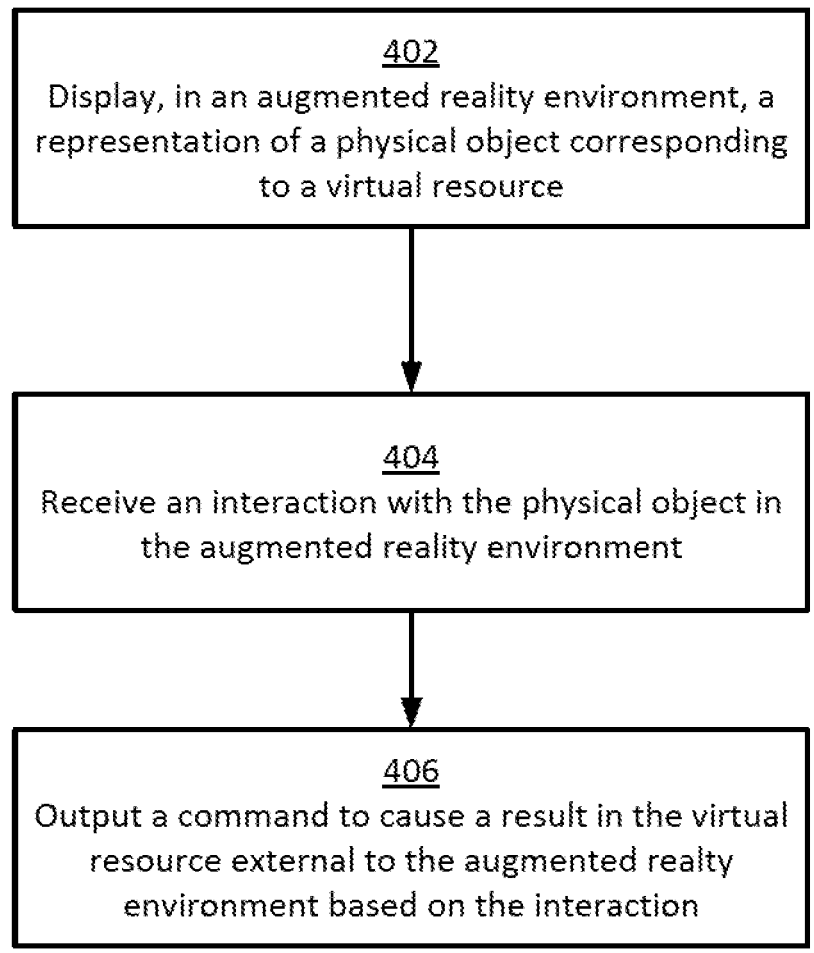
FIG. 4 is a flowchart of a process for implementing virtual resource control from within an augmented reality environment according to some aspects of the present disclosure.

The processor 302 can implement some or all of the steps shown in FIG. 4. Other examples can include more steps, fewer steps, different steps, or a different order of the steps than is shown in FIG. 4. The steps of FIG. 4 are discussed below with reference to the components discussed above in relation to FIG. 3.

In block 402, the processor 302 displays, in an augmented reality environment 308, a representation of a physical object 310 corresponding to a virtual resource 312. The processor 302 can determine the representation of the physical object 310 based on a predefined mapping between virtual resources and physical objects. The representation of the physical object 310 can be displayed via a headset worn by a user, while the user is capable of viewing physical objects external to the augmented reality environment 308, such as a computing device usable for performing operations on or with the virtual resource 312.

In block 404, the processor 302 receives an interaction 314 with the representation of the physical object 310 in the augmented reality environment 308. The interaction 314 may be provided by a controller or some other means (e.g., voice control) and can include a storage capacity adjustment, a powering on or off, a visualization of internal components, or a creation or deletion of the virtual resource 312.

In block 406, the processor 302 outputs a command 316 to cause a result 318 in the virtual resource 312 external to the augmented reality environment 308 based on the interaction 314. The command 316 may also cause an associated input command to be displayed on the computing device, as if the user provided the input command at the computing device instead of the interaction 314 at the representation of the physical object 310 in the augmented reality environment 308. Thus, both the computing device and the augmented reality environment 308 can track and display interactions and corresponding results. Since the result 318 can be implemented in the virtual resource 312 without a user knowing specific commands or actions for causing the result 318 using the computing device, the user may more quickly cause the result 318 without having to have extensive knowledge of the commands or user interface of the computing device.

The foregoing description of certain examples, including illustrated examples, has been presented only for the purpose of illustration and description and is not intended to be exhaustive or to limit the disclosure to the precise forms disclosed. Numerous modifications, adaptations, and uses thereof will be apparent to those skilled in the art without departing from the scope of the disclosure. For instance, examples described herein can be combined together to yield still further examples.

What is claimed is:

1. A system comprising:
   a processor; and
   a memory including instructions that are executable by the processor for causing the processor to:
      display, by an augmented reality system, a physical object representation in an augmented reality environment, the physical object representation corresponding to a virtualized computing resource that is hosted by a computing device external to the augmented reality environment;
      receive, by the augmented reality system, an interaction with the physical object representation in the augmented reality environment, a text command associated with the interaction being configured to be displayed at a user interface of the computing device, the user interface being a command terminal; and
      output, by the augmented reality system, a command to the computing device for causing a result in the virtualized computing resource external to the augmented reality environment based on the interaction, the result comprising a storage capacity adjustment, a powering on or off, or a creation or deletion of the virtualized computing resource.

2. The system of claim 1, wherein the memory further includes instructions that are executable by the processor for causing the processor to:
   display the augmented reality environment at a headset of the augmented reality system associated with the augmented reality environment, wherein the augmented reality environment comprises an overlay of the physical object representation over physical objects in a space external to the augmented reality environment;
   receive, from a controller of the augmented reality system associated with the augmented reality environment, the interaction from a user within the augmented reality environment; and
   determine the result based on a predefined mapping of interactions and results, wherein the predefined mapping includes the interaction.

3. The system of claim 1, wherein the memory further includes instructions that are executable by the processor for causing the processor to:
   display, in the augmented reality environment, a representation of a relationship between the physical object representation and another physical object representation.

4. The system of claim 1, wherein the virtualized computing resource comprises a virtual machine, a container, a virtual disk, a virtual server, or a virtual network.

5. The system of claim 1, wherein the memory further includes instructions that are executable by the processor for causing the processor to:
   automatically implement the result in the virtualized computing resource based on the command.

6. The system of claim 1, wherein the memory further includes instructions that are executable by the processor for causing the processor to:
   receive an input associated with the virtualized computing resource at the user interface external to the augmented reality environment; and
   display an outcome of the input at the virtualized computing resource in the augmented reality environment.

7. The system of claim 1, wherein the physical object representation that corresponds to the virtualized computing resource is predefined.

8. A method comprising:
   displaying, by an augmented reality system, a physical object representation in an augmented reality environment, the physical object representation corresponding to a virtualized computing resource that is hosted by a computing device external to the augmented reality environment;
   receiving, by the augmented reality system, an interaction with the physical object representation in the augmented reality environment, a text command associated with the interaction being configured to be displayed at a user interface of the computing device, the user interface being a command terminal; and
   outputting, by the augmented reality system, a command to the computing device for causing a result in the virtualized computing resource external to the augmented reality environment based on the interaction, the result comprising a storage capacity adjustment, a powering on or off, or a creation or deletion of the virtualized computing resource.

9. The method of claim 8, further comprising:
   displaying the augmented reality environment at a headset of the augmented reality system associated with the augmented reality environment, wherein the augmented reality environment comprises an overlay of the physical object representation over physical objects in a space external to the augmented reality environment;
   receiving, from a controller of the augmented reality system associated with the augmented reality environment, the interaction from a user within the augmented reality environment; and
   determining the result based on a predefined mapping of interactions and results, wherein the predefined mapping includes the interaction.

10. The method of claim 8, further comprising:
    displaying, in the augmented reality environment, a representation of a relationship between the physical object representation and another physical object representation.

11. The method of claim 8, further comprising:
    automatically implementing the result in the virtualized computing resource based on the command.

12. The method of claim 8, further comprising:
    receiving an input associated with the virtualized computing resource at the user interface external to the augmented reality environment; and
    displaying an outcome of the input at the virtualized computing resource in the augmented reality environment.

13. The method of claim 8, wherein the physical object representation that corresponds to the virtualized computing resource is predefined.

14. A non-transitory computer-readable medium comprising program code that is executable by a processor for causing the processor to:

display, by an augmented reality system, a physical object representation in an augmented reality environment, the physical object representation corresponding to a virtualized computing resource that is hosted by a computing device external to the augmented reality environment;

receive, by the augmented reality system, an interaction with the physical object representation in the augmented reality environment, a text command associated with the interaction being configured to be displayed at a user interface of the computing device, the user interface being a command terminal; and output, by the augmented reality system, a command to the computing device for causing a result in the virtualized computing resource external to the augmented reality environment based on the interaction, the result comprising a storage capacity adjustment, a powering on or off, or a creation or deletion of the virtualized computing resource.

15. The non-transitory computer-readable medium of claim 14, further comprising program code that is executable by the processor for causing the processor to:

display the augmented reality environment at a headset of the augmented reality system associated with the augmented reality environment, wherein the augmented reality environment comprises an overlay of the physical object representation over physical objects in a space external to the augmented reality environment;

receive, from a controller of the augmented reality system associated with the augmented reality environment, the interaction from a user within the augmented reality environment; and determine the result based on a predefined mapping of interactions and results, wherein the predefined mapping includes the interaction.

16. The non-transitory computer-readable medium of claim 14, further comprising program code that is executable by the processor for causing the processor to:

display, in the augmented reality environment, a representation of a relationship between the physical object representation and another physical object representation.

17. The non-transitory computer-readable medium of claim 14, further comprising program code that is executable by the processor for causing the processor to:

automatically implement the result in the virtualized computing resource based on the command.

18. The non-transitory computer-readable medium of claim 14 further comprising program code that is executable by the processor for causing the processor to:

receive an input associated with the virtualized computing resource at the user interface external to the augmented reality environment; and display an outcome of the input at the virtualized computing resource in the augmented reality environment.

19. The non-transitory computer-readable medium of claim 14, wherein the physical object representation that corresponds to the virtualized computing resource is predefined.

\* \* \* \* \*